L. Stevens,
Tenoning Machine.
N° 17,175. Patented Apr. 28, 1857.
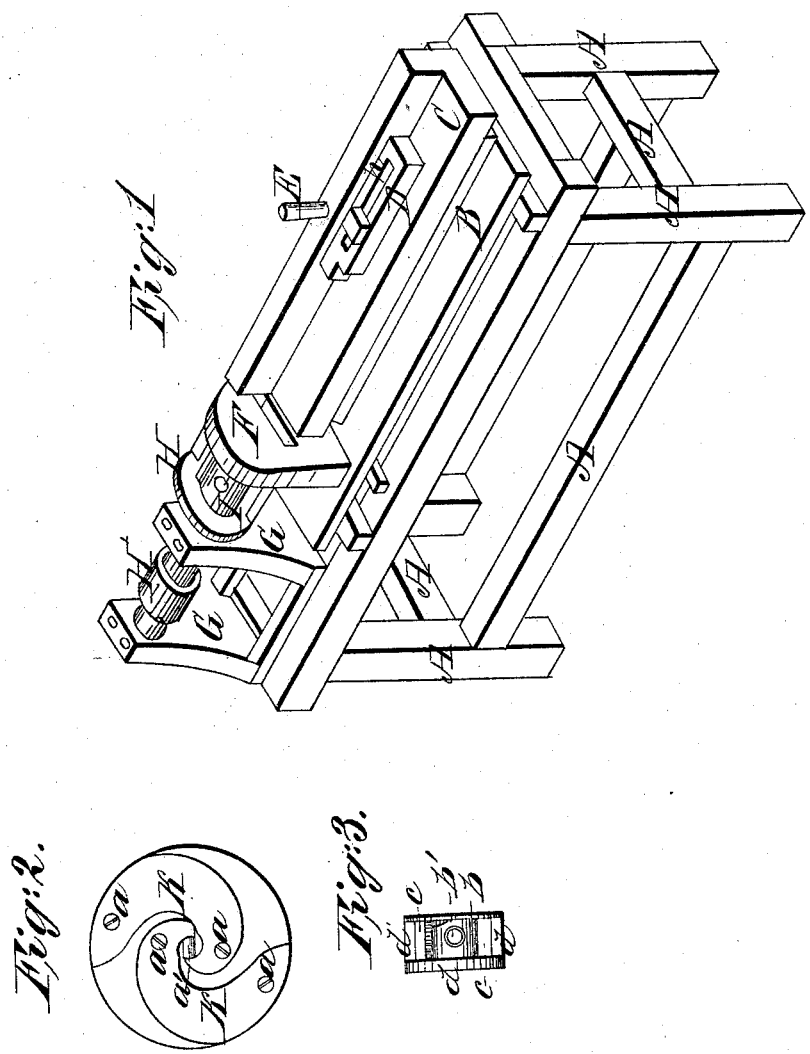

UNITED STATES PATENT OFFICE.

LA FAYETTE STEVENS, OF ELMIRA, NEW YORK.

MACHINE FOR TENONING BLIND-SLATS.

Specification of Letters Patent No. 17,175, dated April 28, 1857.

*To all whom it may concern:*

Be it known that I, LA FAYETTE STEVENS, of the town of Elmira, in the county of Chemung and State of New York, have invented a new and Improved Machine for Tenoning Slats for Blinds; and I do hereby declare that the following is a full and exact description thereof, reference being had to the accompanying drawings and to the letters of reference marked thereon.

The nature of my invention consists in improvements in the mandrel head and sliding table and gage for regulating the length of the tenon to bicut and the use of a spur for cutting off the end of the tenon.

In the drawing Figure 1 is an isometrical view of the machine. Fig. 2 is a section showing the cutters. Fig. 3 is a section of the head of the mandrel.

To enable others skilled in the art to make and use my invention I will proceed to describe its construction and operation.

In the construction of my invention, I use any of the known materials used for such purposes.

In Fig. 1 A is the frame, B the stationary table with dovetail groove, into which the tongue of the sliding table fits and in which it slides back and forth, C the sliding table, D the movable gage, (*h*) slot in the gage, (*i*) screw with collar for allowing the gage to slide on, E handle for operating the sliding table, F the slotted guide for directing and holding the slot to the cutters, G the bearings of the mandrel, H the mandrel, I the head of the mandrel to which the cutters are attached.

In Fig. 2 K the cutters, (*a*) the screws by which the knives or cutters are fastened to the mandrel, (*a'*) the opening for the tenon to pass into, between the knives or cutters and into the head of the mandrel, and where it comes in contact with a spur for cutting it, the tenon, off at equal lengths, the spur is seen in Fig. 3 (*b'*).

In Fig. 3, *b* the head of the mandrel with cutters attached, *b'* the hole and spur let in for cutting off the end of the tenon, (*c*) a slot cut out on each side of the mandrel head for the chips to pass off, from the cutters, *d* the back part of the head left solid. The slotted opening in the head is made to correspond with the shape of the cutters on the sides of the slots next the axis, for the purpose of the more readily discharging the chips, (*d*) the arm to which the cutters K are attached at the outer ends.

In the operation of my invention the mandrel is operated by means of a belt applied to the pulley H' on the mandrel, thus causing the cutters to revolve. The slat is cut to the length required, the gage D is now set to the required length, and the slat is placed on the sliding table with the rear end resting against the projecting end of the gage and the table is slid up to the knives or cutters K through the slot in guide F, as the tenon is cut by means of the cutters it passes into the hole in the end of the mandrel head when it will be cut off by the spur (*b'*) the tenon on this first end being completed, the table is slid back and the slat turned and laid on the table ready to tenon the other end. It will be seen that the front end of the movable gage D has two shoulders which are of great importance in its operation, for the slats which I use in the patented "Climax blind" are made with one tenon shorter than the other. The tenon first cut is allowed to fall past the first and rest on the second shoulder, thus making the last tenon cut just as much shorter than the first as the length of shoulder on the movable gage D. By this arrangement I am enabled to cut a long and short tenon on the same slat, which is an essential feature in my machine, for the purpose of making slats for the Climax blind. If I wish to make my tenons of equal length I can do so by reversing the movable gage D in the slotted head of the mandrel. I find the chips are not likely to catch and choke the cutters, as the knives or cutters are left free and facility is given for them to escape readily.

Having thus fully described the nature of my invention what I claim as new and desire to secure by Letters Patent, is:

The movable and reversible gage D, as described in combination with the sliding table C, arranged and operating in connection with the mandrel head I as made, and cutters K, and spur *b'*, as described and for the purpose set forth.

LA FAYETTE STEVENS.

Witnesses:
 THO. S. SPAULDING,
 J. W. REYNOLDS.